US008855349B2

(12) United States Patent
Yeh et al.

(10) Patent No.: US 8,855,349 B2
(45) Date of Patent: Oct. 7, 2014

(54) PORTABLE SPEAKER

(75) Inventors: Chih-Shan Yeh, Taoyuan County (TW); Ming-Yu Chen, Taoyuan County (TW); Yien-Chun Kuo, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 407 days.

(21) Appl. No.: 13/191,482

(22) Filed: Jul. 27, 2011

(65) Prior Publication Data
US 2013/0028457 A1 Jan. 31, 2013

(51) Int. Cl.
H04R 9/06 (2006.01)
H04R 1/02 (2006.01)
H04R 1/10 (2006.01)
H04M 1/60 (2006.01)

(52) U.S. Cl.
CPC .............. H04R 1/10 (2013.01); H04M 1/6041 (2013.01)
USPC ........................................................ 381/334

(58) Field of Classification Search
USPC .................................... 381/332, 334, 87, 345
See application file for complete search history.

(56) References Cited

U.S. PATENT DOCUMENTS

| | | | | |
|---|---|---|---|---|
| 6,680,449 B1 * | 1/2004 | Wang | ............................ | 200/334 |
| 7,218,746 B2 * | 5/2007 | Schmidt et al. | ................ | 381/334 |
| 7,961,901 B2 * | 6/2011 | Konig | ........................... | 381/390 |
| 8,284,972 B2 * | 10/2012 | Lin | ............................. | 381/322 |
| 2008/0025542 A1 * | 1/2008 | Lee et al. | ....................... | 381/334 |
| 2008/0279406 A1 | 11/2008 | D'Hoogh | | |
| 2009/0103766 A1 * | 4/2009 | Daucke et al. | ................ | 381/386 |
| 2010/0210327 A1 * | 8/2010 | Kim | ............................ | 455/575.3 |
| 2011/0303521 A1 | 12/2011 | Niu et al. | | |

FOREIGN PATENT DOCUMENTS

| | | |
|---|---|---|
| CN | 1258983 | 7/2000 |
| CN | 1317811 | 10/2001 |
| CN | 200966132 | 10/2007 |
| CN | 201163808 | 12/2008 |
| CN | 101340468 | 1/2009 |
| KR | 100677410 | 2/2007 |
| TW | 201006264 | 2/2010 |
| TW | 201010566 | 3/2010 |
| WO | 2007042632 | 4/2007 |

OTHER PUBLICATIONS

"Pallet elevato"r, www.optimungroup.com.au/upload/product, Jun. 10, 2008.*

(Continued)

Primary Examiner — Vivian Chin
Assistant Examiner — David Ton
(74) Attorney, Agent, or Firm — Jianq Chyun IP Office

(57) ABSTRACT

A portable speaker having a base, a cover, a scissors mechanism, a positioning mechanism, a restoring element, a push-push type mechanism and a speaker module is provided. The scissors mechanism, the positioning mechanism, the restoring element, the push-push type mechanism are disposed between the base and the cover, respectively. The scissors mechanism translates the cover vertically. The positioning mechanism translates the cover to an original position, a first position or a second position. The restoring element repositions the cover from the first position to the original position or the second position. The push-push type mechanism fixes the cover to the original position or the second position. The speaker module is disposed in the base or the cover, wherein the sound from the speaker module is able to be output from the interval between the base and the cover when the cover is at the second position.

17 Claims, 5 Drawing Sheets

(56) References Cited

OTHER PUBLICATIONS

Rocher, "Making portable music with Saitek", www.tomsguide.com/us/making-portable-music-with-saitek,review-548.html; Sep. 29, 2005.*

"Office Action of Germany Counterpart Application", issued on Sep. 19, 2012, p. 1-p. 29, in which the listed references were cited.

http://web.archive.org/web/20100107171611/http:/www.saitek.com/manuals/a200_manual.pdf, retrieved on Jan. 7, 2010, Mad Catz Interactive Asia Limited, "Saitek A-200 Portable 2.1 Speaker System, Quick Start Guide and User Manual," pp. 1-30, in which pp. 1-6 are English Guide.

"First Office Action of China Counterpart Application", issued on Jun. 27, 2014, p. 1-p. 9, in which the listed references were cited.

"Office Action of Taiwan Counterpart Application", issued on Jun. 4, 2014, p. 1-p. 5, in which the listed references were cited.

* cited by examiner

PORTABLE SPEAKER

BACKGROUND OF THE INVENTION

1. Field of the Invention

The disclosure relates to a speaker. Particularly, the disclosure relates to a portable speaker.

2. Description of Related Art

With rapid development of mobile phone-related technology, a mobile phone not only provides a basic mobile phone-call function, but also provides a plurality of additional functions through hardware and software improvement. The additional functions are, for example, a music playing function and a hands-free function, etc. When the music playing function is activated, a user may play music through a speaker of the mobile phone. Moreover, when the hands-free function is activated, the sound may be played and captured through a speaker and a microphone of the mobile phone without the user closing to the mobile phone.

The user may play music through the speaker equipped on the mobile phone. However, limited by an inherent size of the mobile phone, the speaker on the mobile phone is not as good as an external speaker in performance. Moreover, some users use the hands-free function of the mobile phone for teleconference. However, also limited by the inherent size of the mobile phone, the speaker and the microphone equipped on the mobile phone are not as good as a professional teleconference device in performance.

SUMMARY OF THE INVENTION

The disclosure is directed to a portable speaker, which is used for outputting sound.

The disclosure provides a portable speaker including a base, a cover, a scissors mechanism, at least one positioning mechanism, at least one restoring element, a push-push type mechanism and a speaker module. The scissors mechanism is disposed between the base and the cover, and translates the cover vertically relative to the base. The positioning mechanism is disposed between the base and the cover, and translates the cover to an initial position, a first position or a second position relative to the base. The restoring element is disposed between the base and the cover, and restores the cover from the first position to the initial position or the second position relative to the base. The push-push type mechanism is disposed between the base and the cover, and fixes the cover to the initial position or the second position relative to the base. The speaker module is disposed in the base or the cover, wherein a sound generated by the speaker module is able to be output from an interval between the base and the cover when the cover is located at the second position relative to the base.

According to the above descriptions, by pressing the cover to translate the cover relative to the base, the sound generated by the speaker module may be output from the interval between the base and the cover.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 3 is a three-dimensional exploded top view of the portable speaker of

FIG. 1.

DETAILED DESCRIPTION OF DISCLOSED EMBODIMENTS

Figure 1:
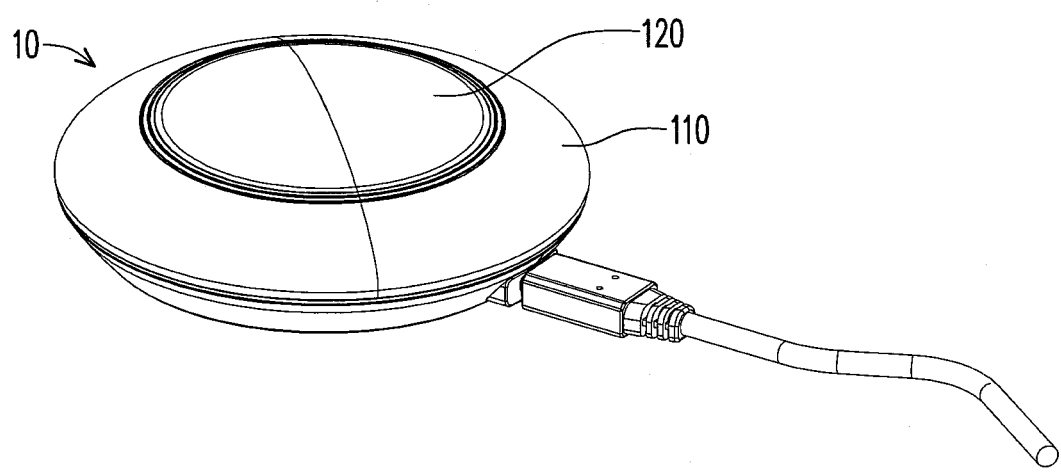
FIG. 1 is a three-dimensional view of a portable speaker with a cover located at an initial position according to an embodiment of the disclosure.
Figure 2:
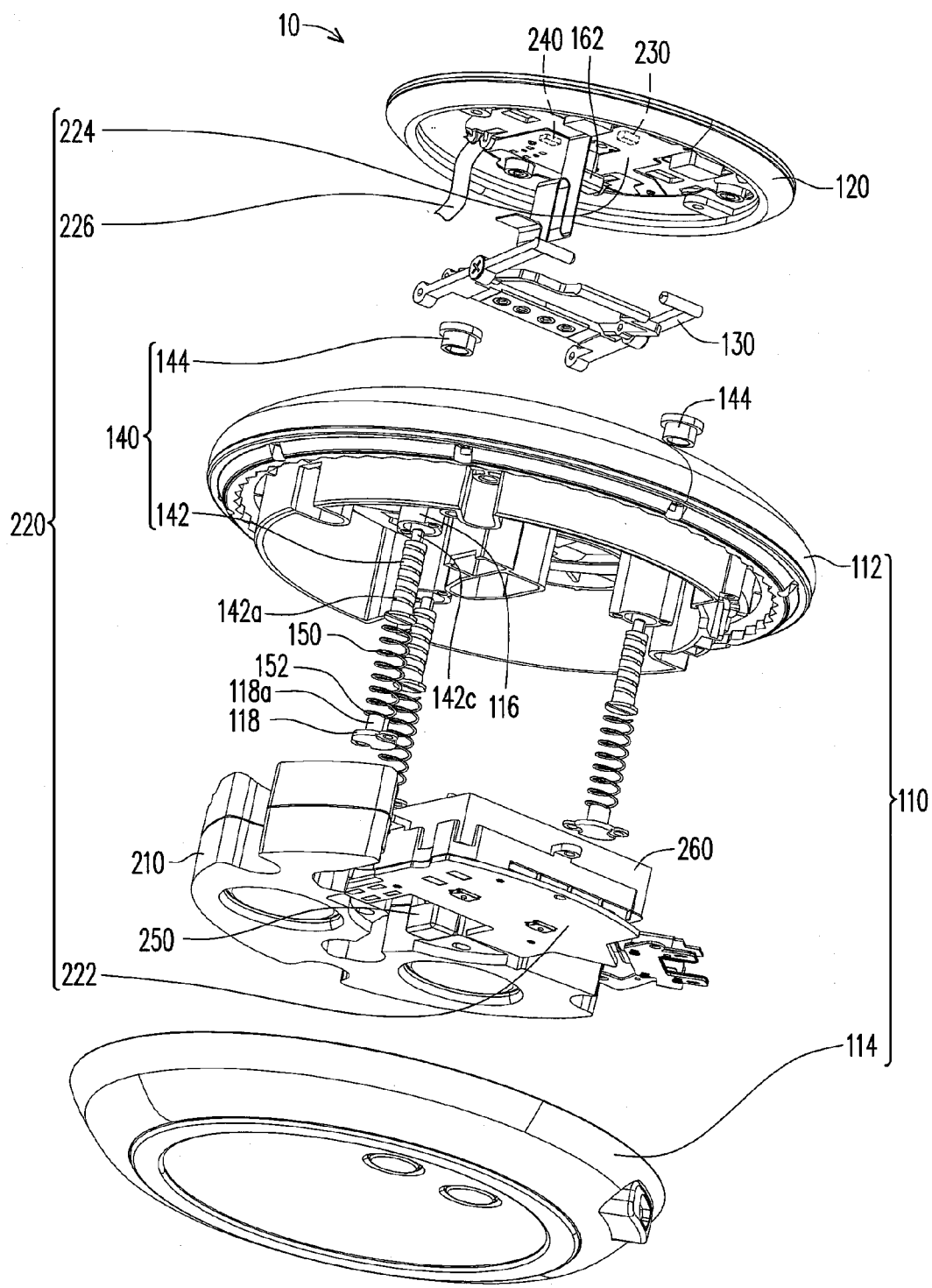
FIG. 2 is a three-dimensional exploded bottom view of the portable speaker of FIG. 1.
Figure 3:
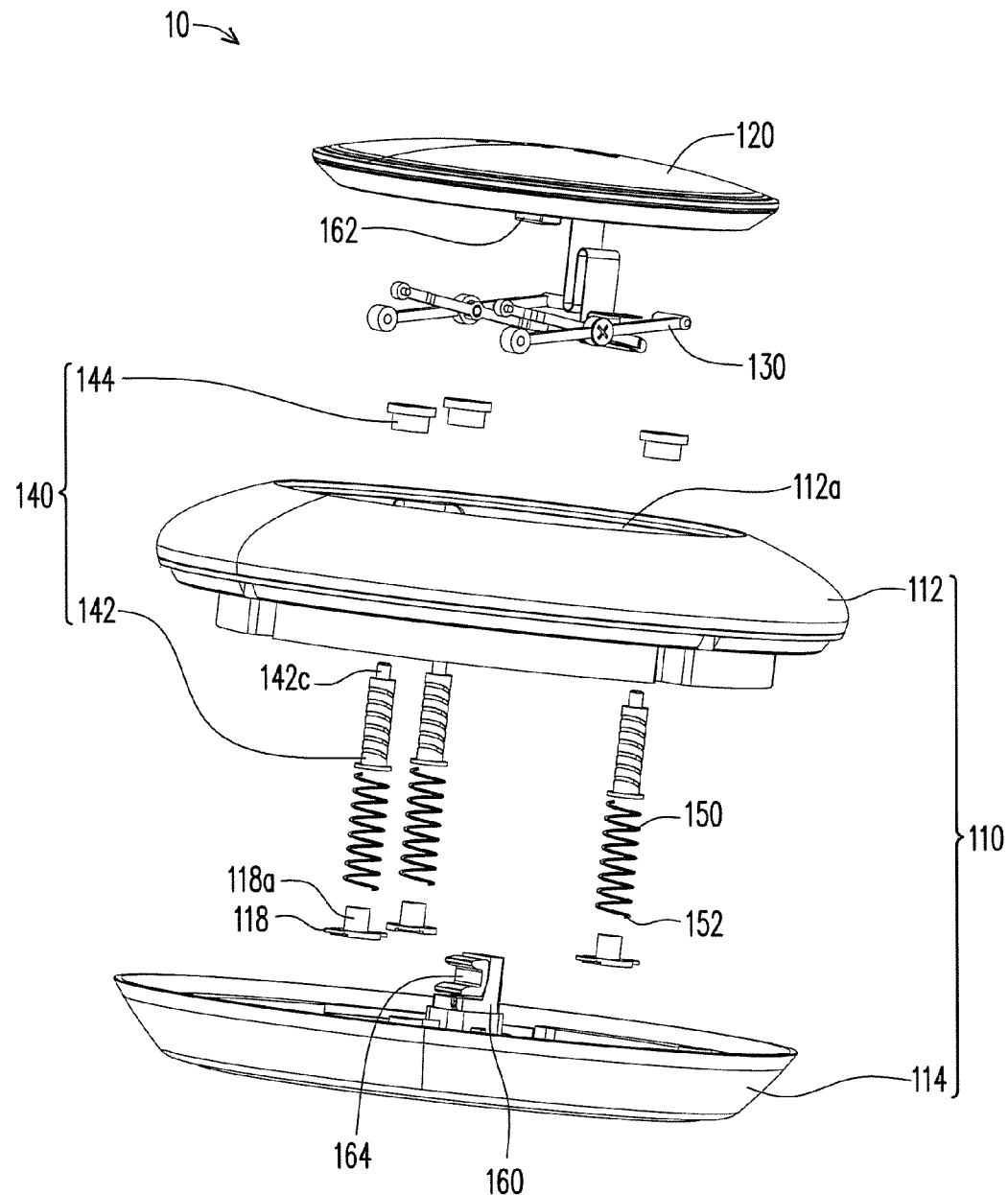

FIG. 1 is a three-dimensional view of a portable speaker with a cover located at an initial position according to an embodiment of the disclosure. FIG. 2 and FIG. 3 are respectively three-dimensional exploded bottom and top views of the portable speaker of FIG. 1. Referring to FIG. 1, FIG. 2 and FIG. 3, the portable speaker 10 includes a base 110, a cover 120, a scissors mechanism 130, at least one positioning mechanism 140, at least one restoring element 150, a push-push type mechanism 160 and a speaker module 210.

The scissors mechanism 130 is disposed between the base 110 and the cover 120, and is suitable for translating the cover 120 vertically relative to the base 110.

The positioning mechanism 140 is disposed between the base 110 and the cover 120, and is suitable for translating the cover 120 to an initial position, a first position (shown in FIG. 4A) or a second position (shown in FIG. 4B) relative to the base 110. In the present embodiment, the initial position is between the first position and the second position.

The restoring element 150 is disposed between the base 110 and the cover 120, and is suitable for restoring the cover 120 from the first position to the initial position or the second position relative to the base 110.

The push-push type mechanism 160 is disposed between the base 110 and the cover 120, and is suitable for fixing the cover 120 to the initial position or the second position relative to the base 110.

The speaker module 210 is disposed in the base 110. When the cover 120 is located at the second position (shown in FIG. 4B) relative to the base 110, a sound generated by the speaker module 210 is able to be output from an interval between the base 110 and the cover 120. In another embodiment that is not illustrated, the speaker module may also be disposed in the cover, and the sound generated by the speaker module is able to be output from the interval between the base and the cover.

In an embodiment, the base 110 may have a top cover 112 and a bottom cover 114. The top cover 112 is closed to the bottom cover 114, and the top cover 112 has a concave portion 112a. When the cover 120 is located at the initial position or the first position relative to the base 110, the cover 120 is contained in the concave portion 112a. When the cover 120 is located at the second position relative to the base 110, the cover 120 is not contained in the concave portion 112a, and is located above the concave portion 112a. Therefore, a whole appearance of the portable speaker 10 is varied along with a position (the initial position or the second position) of the cover 120.

In the present embodiment, when the cover 120 is located at the initial position relative to the base 110, an outline of the cover 120 is substantially complied with an outline of the base 110, which avails improving a visual effect and a hold and touch feeling.

In the present embodiment, the portable speaker 10 further includes a buckle 162, and the buckle 162 is fixed to the cover 120. The push-push type mechanism 160 is fixed in the base 110 and has a hook 164. The buckle 162 may be engaged to the hook 164, and whether the hook 164 is engaged to the buckle 162 determines whether the cover 120 is located at the initial position relative to the base 110.

Figure 4A:
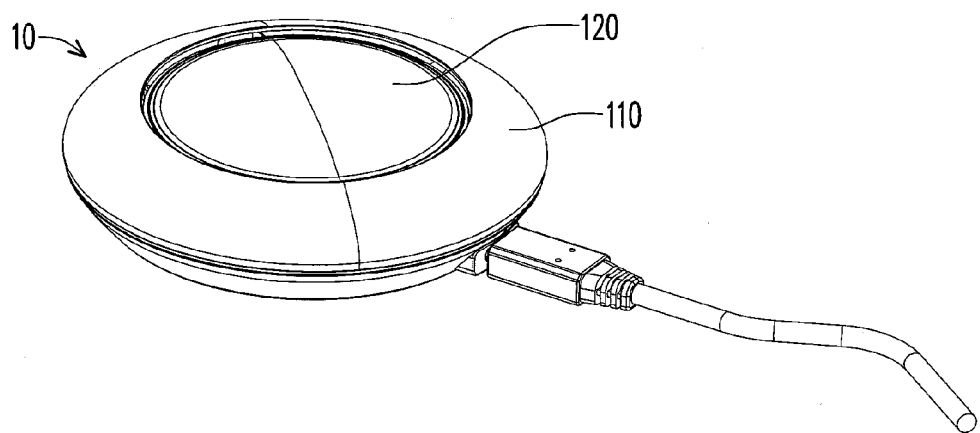
FIG. 4A is a three-dimensional view of the portable speaker of FIG. 1 with a cover located at a first position.
Figure 4B:
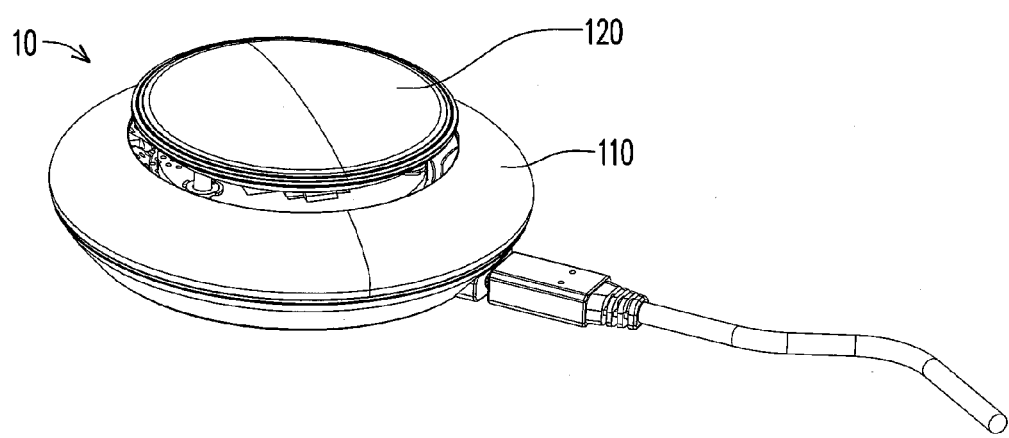
FIG. 4B is a three-dimensional view of the portable speaker of FIG. 1 with a cover located at a second position.

FIG. 4A and FIG. 4B are three-dimensional views of the portable speaker of FIG. 1 with the cover respectively located at the first position and the second position. Referring to FIG. 1, FIG. 4A and FIG. 4B, when the cover 120 is located at the initial position, if a user presses the cover 120, the cover 120 is translated from the initial position (shown in FIG. 1) to the first position (shown in FIG. 4A), and the buckle 162 is released from the hook 164. Then, the user may releases the force exerted to the cover 120, and the restoring element 150 translates the cover 120 relative to the base 110 until the cover 120 is reach to the second position by the positioning mechanism 140 (shown in FIG. 4B).

When the cover 120 is located at the second position (shown in FIG. 4B), the user presses the cover 120, and the cover 120 is translated from the second position to the first position (shown in FIG. 4A). Then, the user releases the force exerted on the cover 120, and the restoring element 150 translates the cover 120 relative to the base 110 until the buckle 162 is engaged to the hook 164, and the cover 120 stays at the initial position (shown in FIG. 1).

Figure 5:
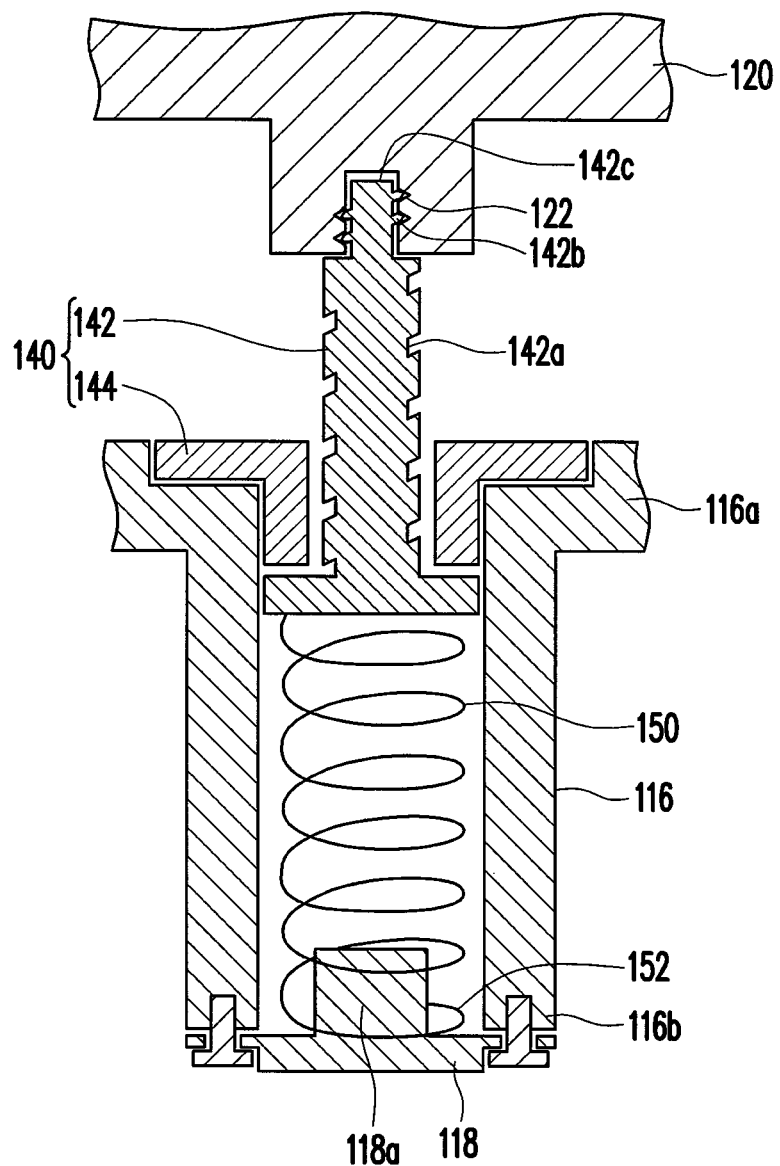
FIG. 5 is a partial cross-sectional view of the portable speaker of FIG. 4B with the cover located at the second position.

FIG. 5 is a partial cross-sectional view of the portable speaker of FIG. 4B with the cover located at the second position. The base 110 may have a sleeve pipe 116 and an end plate 118, where the end plate 118 may be fixed to a bottom end 116b of the sleeve pipe 116 by screws or other manners. The positioning mechanism 140 may include a slide shaft 142 and a shaft sleeve 144. The slide shaft 142 and the restoring element 150 are contained in the sleeve pipe 116. One end of the slide shaft 142 is fixed to the cover 120. In the present embodiment, the cover 120 may have at least one internal thread 122, and the slide shaft 142 may have an external thread 142b, and the slide shaft 142 is screw-locked to the internal thread 122 of the cover 120 through the external thread 142b. The shaft sleeve 144 is fixed to a top end 116a of the sleeve pipe 116 opposite to the bottom end 116b, and slidably fits the slide shaft 142. The slide shaft 142 has a flange 142c, the flange 142c slidably fits the sleeve pipe 116, and the shaft sleeve 144 may block the flange 142c to place the cover 120 to the second position (shown in FIG. 4B) relative to the base 110.

In the present embodiment, the slide shaft 142 may have a spiral oil trench 142a for accommodating lubricating oil, so as to maintain a lubricating effect and reduce friction between the slide shaft 142 and the sleeve pipe 116. Moreover, the restoring element 150 is located between the slide shaft 142 and the end plate 118, the end plate 118 has a convex pillar 118a, and the convex pillar 118a is sleeved by an end portion 152 of the restoring element 150. In the present embodiment, the restoring element 150 may be a spiral spring, and the end portion thereof sleeves the convex pillar 118a.

In the present embodiment, the portable speaker 10 further includes a switch device 240, which is disposed between the base 110 and the cover 120. Therefore, when the cover 120 is translated to the first position (shown in FIG. 4A) relative to the base 110, the movement of the cover 120 relative to the base 110 triggers the switch device 240 to activate or deactivate the speaker module 210.

In detail, when the cover 120 is located at the initial position (shown in FIG. 1), the speaker module 210 is in a turn-off state. When the user presses the cover 120 to translate the cover 120 from the initial position to the first position (shown in FIG. 4A), the buckle 162 fixed to the cover 120 may be released from the hook 164 of the push-push type mechanism 160. Then, the user releases the force exerted on the cover 120, and the cover 120 is translated from the first position the second position (shown in FIG. 4B) under a function of the restoring element 150. As the switch device 240 is triggered by the movement of the cover 120 relative to the base 110, the speaker module 210 is switched from the turn-off state to a turn-on state. When the cover 120 is located at the second position (shown in FIG. 4B), the sound generated by the speaker module 210 may be output from an interval between the base 110 and the cover 120.

Comparatively, when the user again presses the cover 120 to translate the cover 120 from the second position (shown in FIG. 4B) to the first position (shown in FIG. 4A), the buckle 162 fixed to the cover 120 is engaged to the hook 164 of the push-push type mechanism 160. Then, the user releases the force exerted on the cover 120, and the cover 120 is translated from the first position to the initial position (shown in FIG. 1) under the function of the restoring element 150. As the switch device 240 is triggered by the movement of the cover 120 relative to the base 110, the speaker module 210 is switched from the turn-on state to the turn-off state.

Referring to FIG. 2, in the present embodiment, the portable speaker 10 may include a circuit module 220. The circuit module 220 includes a first circuit board 222, a second circuit board 224 and a flexible circuit board 226. The first circuit board 222 is disposed in the base 110, and the second circuit board 224 is disposed in the cover 120. The second circuit board 224 is electrically connected to the first circuit board 222 through the flexible circuit board 226.

The portable speaker 10 further includes a microphone module 230, a wireless transmission module 250 and a power supply module 260, which are respectively disposed in the base 110 or the cover 120, and are electrically connected to the circuit module 220 (for example, the first circuit board 222 or the second circuit board 224). In the present embodiment, the microphone module 230 is disposed in the cover 120, and is electrically connected to the circuit module 220 (for example, the second circuit board 224). The wireless transmission module 250 and the power supply module 260 are disposed in the base 110, and are electrically connected to the circuit module 220 (for example, the first circuit board 222). However, positions of the microphone module 230, the wireless transmission module 250 and the power supply module 260 are not limited to that described above.

The portable speaker 10 of the present embodiment may be connected to other devices in a wireless manner through the wireless transmission module 250, for example, connected to a mobile phone through Bluetooth. Based on the wireless transmission, audio files stored in the mobile phone or sounds of the ongoing phone-call may be directly played through the portable speaker 10 of the disclosure, by which a poor sound effect of the speaker equipped on the mobile phone is avoided, so as to meet a high mobility demand of the user.

When the portable speaker 10 of the disclosure is equipped with the microphone module 230, if the user wants to use the hands-free function of the mobile phone during a process of making a phone-call, the mobile phone may be connected to the portable speaker 10 of the disclosure through a wireless manner (for example, the Bluetooth), in this way, voice signals of the mobile phone may be directly played through the portable speaker 10, and local voices may be picked up by the microphone module 230 of the portable speaker 10.

In summary, by pressing the cover to translate the cover relative to the base, the sound generated by the speaker module may be output from the interval between the base and the cover. In the disclosure, the microphone module and the wireless transmission module may be further used to provide diversified functions.

It will be apparent to those skilled in the art that various modifications and variations may be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A portable speaker, comprising:
    a base;
    a cover;
    a scissors mechanism, disposed between the base and the cover, and translating the cover vertically relative to the base;
    at least one positioning mechanism, disposed between the base and the cover, and translating the cover to an initial position, a first position or a second position relative to the base;
    at least one restoring element, disposed between the base and the cover, and restoring the cover from the first position to the initial position or the second position relative to the base;
    a push-push type mechanism, disposed between the base and the cover, and fixing the cover to the initial position or the second position relative to the base; and
    a speaker module, disposed in the base or the cover,
    wherein when the cover is located at the second position relative to the base, a sound generated by the speaker module is output horizontally and radially from an annular opening between the base and the cover.

2. The portable speaker as claimed in claim 1, wherein the initial position is located between the first position and the second position.

3. The portable speaker as claimed in claim 1, wherein the base has a concave portion, when the cover is located at the initial position or the first position relative to the base, the cover is contained in the concave portion, and when the cover is located at the second position relative to the base, the cover is not contained in the concave portion, and is located above the concave portion.

4. The portable speaker as claimed in claim 3, wherein the base has a top cover and a bottom cover, the top cover is closed to the bottom cover, and the top cover has the concave portion.

5. The portable speaker as claimed in claim 1, wherein when the cover is located at the initial position relative to the base, an outline of the cover is substantially complied with an outline of the base.

6. The portable speaker as claimed in claim 1, wherein the positioning mechanism comprises:
    a slide shaft, slidably connected to the base, wherein one end of the slide shaft is fixed to the cover; and
    a shaft sleeve, fixed to the base, and slidably fitting the slide shaft.

7. The portable speaker as claimed in claim 6, wherein the slide shaft has a spiral oil trench.

8. The portable speaker as claimed in claim 6, wherein the cover has at least one internal thread, and the slide shaft has an external thread, and the external thread is screw-locked to the internal thread.

9. The portable speaker as claimed in claim 6, wherein the base has a sleeve pipe and an end plate, the end plate is fixed to a bottom end of the sleeve pipe, the slide shaft and the restoring element are contained in the sleeve pipe, the restoring element is located between the slide shaft and the end plate, and the shaft sleeve is fixed to a top end of the sleeve pipe opposite to the bottom end.

10. The portable speaker as claimed in claim 9, wherein the restoring element is a spiral spring, the end plate has a convex pillar, and the convex pillar is sleeved by an end portion of the restoring element.

11. The portable speaker as claimed in claim 9, wherein the slide shaft has a flange, the flange slidably fits the sleeve pipe, and the shaft sleeve is capable of blocking the flange to limit the cover to the second position relative to the base.

12. The portable speaker as claimed in claim 1, further comprising:
    a buckle, fixed to the cover, wherein the push-push type mechanism is fixed in the base and has a hook, and whether the hook is engaged to the buckle determines whether the cover is located at the initial position relative to the base.

13. The portable speaker as claimed in claim 1, further comprising:
    a microphone module, disposed in the base or the cover.

14. The portable speaker as claimed in claim 1, further comprising:
    a switch device, disposed between the base and the cover, wherein when the cover is translated to the first position relative to the base, the movement of the cover relative to the base triggers the switch device.

15. The portable speaker as claimed in claim 1, further comprising:
    a circuit module, comprising:
    a first circuit board, disposed in the base;
    a second circuit board, disposed in the cover; and
    a flexible circuit board, electrically connecting the second circuit board and the first circuit board.

16. The portable speaker as claimed in claim 1, further comprising:
    a wireless transmission module, disposed in the base or the cover.

17. The portable speaker as claimed in claim 1, further comprising:
    a power supply module, disposed in the base or the cover.

* * * * *